United States Patent Office 3,634,446
Patented Jan. 11, 1972

3,634,446
1-METHYL-2-ISOPROPYL-5-NITROIMIDAZOLE AND WATER SOLUBLE SALTS THEREOF
Max Hoffer and Milan Mitrovic, Nutley, N.J., assignors to Hoffmann-La Roche Inc., Nutley, N.J.
No Drawing. Application Apr. 17, 1969, Ser. No. 817,179, now Patent No. 3,502,776, dated Mar. 24, 1970, which is a continuation-in-part of application Ser. No. 541,968, Apr. 12, 1966. Divided and this application Oct. 6, 1969, Ser. No. 864,191
Int. Cl. C07d 49/36
U.S. Cl. 260—309                               1 Claim

ABSTRACT OF THE DISCLOSURE

The preparation of 1-methyl-2-isopropyl-5-nitroimidazole by nitration of 2-isopropylimidazole to form the 2-isopropyl-4(or 5)-nitroimidazole intermediate which then is methylated is disclosed. The water soluble salts thereof are prepared by reacting with the appropriate acid. The products have anti-histomonas and antitrichomonas properties. Compositions containing the active ingredient are also disclosed.

RELATED APPLICATIONS

This application is a division of U.S. patent application Ser. No. 817,179 filed Apr. 17, 1969, now U.S. Pat. No. 3,502,776, which in turn is a continuation-in-part of U.S. patent application Ser. No. 541,968 filed Apr. 12, 1966, now abandoned, the benefit of the dates of which are claimed.

DETAILED DESCRIPTION

This invention relates to a novel imidazole derivative useful in the veterinary field, to a novel intermediate in the preparation thereof and to compositions containing said novel imidazole derivative. More particularly, the invention relates to 1-methyl-2-isopropyl-5-nitroimidazole or its pharmaceutically acceptable water-soluble acid addition salts or mixtures thereof and to their use for promoting growth of turkeys, increasing feed efficiency in turkeys and for preventing and treating turkey blackhead.

According to the present invention it has been found that 1-methyl-2-isopropyl-5-nitroimidazole possesses an unexpectedly high activity against turkey blackhead disease, increases feed efficiency and promotes growth of the birds when administered to them at low concentrations in the diet. Turkey blackhead or enterohepatitis is an extremely fatal disease occurring in poultry, especially in turkeys. It is produced by the organism *Histomonas meleagridis* which is carried in the egg of the cecal worm *Heterakis Gallinae*.

The novel 1-methyl-2-isopropyl-5-nitroimidazole, its pharmaceutically acceptable water-soluble acid addition salts or mixtures thereof of this invention have been found to effect a complete cure of *Histomonas meleagridis* infected turkeys when administered to provide the active compound at levels as low as 0.005 percent by weight of the feed ration. Prophylaxis can be obtained with even lower doses. For the effective control of enterohepatitis in turkeys the active compound of this invention can be administered at levels of from about 0.001 percent to about 0.050 percent by weight of the diet. The preferred concentration will, of course, depend to some extent upon the severity of the infection. In most cases, however, a turkey ration containing about 0.003 percent to about 0.025 percent by weight is suitable for prevention with 0.00625 percent preferred and 0.0125 to 0.025 is preferred for therapy. When utilized in drinking water in the form of its water-soluble acid addition salts, the levels of active compound administered are one-half the amount utilized in feed.

For increased feed efficiency and growth promotion in turkeys the active compound of this invention can be administered at levels of from about 0.001 percent to about 0.05 percent. The preferred concentration will, of course, depend to some extent upon the condition of the turkeys. Usually for growth promotant purposes, the active compound is added to the feed of the turkeys beginning with the first week of life. Generally about 0.003 percent to about 0.025 percent by weight is suitable with about 0.00312 to about 0.00625 percent by weight preferred. Thus, if it is desired to promote growth only, the optimum effect is achieved with a dosage of about 0.00312 percent in feed. If however, it is desired to promote growth and also combat turkey blackhead, the optimum effect is achieved with a dosage of about 0.00625 in feed.

In addition to its use against turkey blackhead, the novel product of this invention, i.e., 1-methyl-2-isopropyl-5-nitroimidazole, is also useful in combating protozoal infections caused by a variety of organisms among which there can be named *E. histolytica, Trichomonas vaginalis* and *Trichomonas foetus.*

The novel imidazole of this invention is prepared by nitrating 2-isopropylimidazole to give 2-isopropyl-4-(or 5)nitroimidazole. The nitration is suitably carried out by adding a nitrating agent, e.g., a mixture of nitric and sulfuric acids, to the 2-isopropylimidazole starting material. The reaction is conveniently carried out at temperatures in the range of about 0° C. to 100° C. though higher or lower temperatures could also be employed.

The 2-isopropyl-4(or 5)nitroimidazole obtained by the above-described nitration procedure can be readily alkylated by the usual alkylation techniques such as, for example, by treating with dimethylsulfate in an inert solvent preferably at an elevated temperature to form the desired 1-methyl-2-isopropyl-5-nitroimidazole. The 2-isopropyl-4(or 5)nitroimidazole intermediate is also a novel compound and thus constitutes a part of this invention.

The novel, pharmaceutically acceptable acid addition salts of 1-methyl-2-isopropyl-5-nitroimidazole are formed by the usual techniques, preferably by reacting with a strong mineral acid in organic media, e.g., isopropanol. Typical suitable mineral acids are, e.g., sulfuric acid, hydrochloric acid, nitric acid. Preferred are hydrochloric acid which forms the water-soluble hydrochloride salt and sulfuric acid which forms the water-soluble bisulfate salt.

The novel imidazole compound of this invention is normally administered to the turkeys intimately mixed in the turkey ration or the drinking water. The drug can be suitably prepared as a premix or feed supplement containing from about 1 percent to about 90 percent by weight of the premix formulation which can also contain carriers or diluents such as corn meal, germ meal, lactose, corn starch, talc, gelation, magnesium stearate, oyster shell flour, calcium silicate and the like. Other compatible medicaments may also be added to the premix. It has been found that the preferred diluents and carriers are oyster shell flour and calcium silicate since they form stable premixes which have good potency retention. The premix can be added to commercial feed and intimately mixed therewith to obtain uniform distribution yielding an effective concentration level of the active compound, 1-methyl-2-isopropyl-5-nitroimidazole, for preventive and therapeutic use as well as for increasing feed efficiency and promoting growth ranging from about 0.001 percent to about 0.05 percent of the commercial feed. The feed supplement or premix containing the novel compounds of this invention can be readily mixed with the turkey ration by any conventional technique for mixing feeds. For convenience in commercial use, it has been found that premixes containing from about 5 percent to about 15 percent by weight of the active compound are prefered with the most preferred, a premix containing about 12.5 percent by weight.

When administering the compound in drinking water, it has been found convenient to utilize water-soluble powders comprising the active compound in the form of its water-soluble pharmaceutically acceptable acid addition salts, preferably the hydrochloride or bisulfate salts, The powder can be composed of only the water-soluble salt, or can be a mixture of the salt of the active compound and water-soluble excipients, e.g., lactose, dextrose, tartaric acid. The powder can be added to drinking water to yield an effective concentration level of the active compound for combating turkey blackhead as well as promoting growth in amounts ranging from 0.001 percent to 0.05 percent of the active compound.

The following examples illustrate the invention. All temperatures are in ° C.

EXAMPLE 1

Preparation of 2-isopropyl-4(or 5)nitroimidazole 2-isopropylimidazole, M.P. 130°–135° (90 g.=0.816 mole) was added under stirring and cooling with ice water to nitric acid, d.=1.4 (200 ml.) in small portions at a temperature not exceeding 20°. Concentrated sulfuric acid was dropped into the resulting solution under stirring and cooling with ice water at 10–20°. The mixture was then heated gradually to a temperature of 80–85° at which the reaction became self-sustaining accompanied by foaming and evolution of nitrous gases. The latter were removed with a current of nitrogen. The temperature was kept below 90° by occasionally immersing the vessel in a prepared ice water bath. When (after 30 to 45 minutes) the gas evolution had ceased, the temperature was raised to 110-120° and the solution kept at that temperature for 30 minutes. The solution was then poured into 300–400 g. of ice and neutralized with ammonia to a pH of 4–5. After standing at 0° for 1–2 hours, the crystallized product was filtered by suction, washed on the filter twice with 100 ml. of cold water and dried at 90–100°. The 2-isopropyl-4-(or 5)nitroimidazole thus obtained melted at 182–183°.

EXAMPLE 2

Preparation of 1-methyl-2-isopropyl-5-nitroimidazole 2-isopropyl-4(or 5)nitroimidazole (31 g.=0.2 mole), dioxane (70 g.) and dimethylsulfate (28 g.=0.22 mole) were heated on a steam bath under reflux for 45 minutes. The solvent was removed in vacuo on a steam bath, the residue dissolved in 20 ml. of water and the product precipitated by the gradual addition of 80 g. of 25 percent sodium hydroxide solution at 0°. A small additional amount was obtained by extraction of the mother liquor with methylene chloride. The product melted at 60°.

The product was purified as follows:

60 g. of product was dissolved in 3 N aqueous hydrochloric acid, the solution was treated with charcoal and filtered. The filtrate was neutralized by the gradual addition of aqueous concentrated ammonia at 0.5° under stirring whereupon the product precipitated in white plates in the measure the neutralization proceeded. The precipitate was filtered by suction, washed on the filter with 50 ml. of ice cold water and dried at room temperature, M.P. 60°.

The hydrochloride salt was formed by reacting the product, dissolved in isopropanol, with 25 percent ethanolic hydrochloric acid, whereupon the salt precipitated and was isolated. It has a melting point of 177–182° dec. Similarly, the bisulfate salt was formed using 96 percent sulfuric acid. It has a melting point of 151.5–152.5°.

EXAMPLE 3

The following example illustrates typical feed supplement formulations embodying the novel 1-methyl-2-isopropyl-5-nitroimidazole of this invention.

1 - methyl - 2 - isopropyl-5-nitroimidazole 6 percent premix for animal use

|  | Grams/kilo |
|---|---|
| 1-methyl-2-isopropyl-5-nitroimidazole | 62.5 |
| Pulverized oyster shell flour | 887.5 |
| Microcel E (calcium silicate) | 50 |
| Total weight (gms.) | 1000.0 |

Procedure (1) The pulverized oyster shell flour was placed in a suitable mixer and while mixing, the Microcel E was slowly added and thoroughly mixed.

(2) While mixing continuously the 1-methyl-2-isopropyl-5-nitroimidazole was slowly added and mixed until the mixture was homogeneous.

(3) This premix was then added to a commercial poultry feed at the ratio of 4 lbs./ton to yield a ratio of about .0125 percent drug and thoroughly mixed.

(4) This medicated feed was used in the mash form and it was also pelleted on a Sprout-Waldron pellet mill.

Amounts of the above premix may be added to the commercial feed to yield medicated levels ranging from 0.001 percent to 0.05 percent. The commercial feeds to which this premix is added may be free of other medicaments or may contain other medicaments if the final mixture is compatible.

1-methyl-2-isopropyl-5-nitroimidazole 12½ percent premix for animal use

|  | Grams/kilo |
|---|---|
| 1-methyl-2-isopropyl-5-nitroimidazole | 125 |
| Pulverized oyster shell flour | 825 |
| Microcel E (calcium silicate) | 50 |
| Total weight (gms.) | 1000 |

Procedure (1) The oyster shell flour was placed in a suitable mixer and while mixing, the Microcel E was slowly added and thoroughly mixed.

(2) While mixing continuously, the 1-methyl-2-isopropyl-5-nitro-imidazole was slowly added and mixed until the mixture was homogeneous.

(3) This premix was then added to a commercial poultry feed at the ratio of 1 lb./ton to yield a ratio of 0.00625 percent drug and thoroughly mixed.

(4) This medicated feed was used in the mash form and it was also pelleted on a Sprout-Waldron pellet mill.

Amounts of the above premix may be added to the commercial feed to yield medicated levels ranging from 0.001 percent to 0.05 percent. The commercial feeds to which this premix is added may be free of other medicaments or may contain other medicaments if the final mixture is compatible.

1-methyl-2-isopropyl-5-nitroimidazole hydrochloride water-soluble powder formulation

|  | Grams |
|---|---|
| 1-methyl-2-isopropyl-5-nitroimidazole hydrochloride | 14.3 |
| Tartaric acid | 4.0 |
| Lactose | 1.7 |
|  | 20.0 |

Procedure (1) The 1-methyl-2-isopropyl-5-nitroimidazole hydrochloride, dextrose, lactose were blended in a suitable mixer to form a homogeneous powder.

(2) 20 grams of the powder was then added to 50 gallons of drinking water to provide 0.00625 percent by weight of the active compound in the drinking water.

Amounts of the powder added to drinking water can be varied to yield levels ranging from 0.001 to 0.050 percent of the active compound. The drinking water can contain other medicaments, nutrients and adjuvants.

EXAMPLE 4

Ten turkey poults for each of medicated group, infected unmedicated controls (IUC) and uninfected unmedicated controls (UUC) were employed. Indicated amounts of the drug were mixed with the turkey feed in a mechanical mixer and given 72 hours in advance of the infection. The infection consisted in administering orally by pipette 200 embryonated eggs of *Heterakis gallinae* containing *Histomonas meleagridis*. The turkeys were kept on the test drug feed mixture for 24 days and then sacrificed and autopsied and examined for hepatic and cecal lesions. The number of survivors and the intensity of lesions appearing in the liver and ceca of each turkey was observed. The percent mortality was recorded for each group. The relative growth rate of the treated turkeys and uninfected controls was determined and is expressed as the weight gain (WG) in percent. 100 percent represents the growth rate of the uninfected unmedicated controls. The results of experiments in which infected turkeys were fed various concentrations of 1-methyl-2-isopropyl-5-nitroimidazole are set forth in the following table.

|  | WG (percent) | Mortality (percent) |
|---|---|---|
| Percent of active Drug in feed: | | |
| 0.0500 | 100 | 0.0 |
| 0.0250 | 102 | 0.0 |
| 0.0125 | 98 | 0.0 |
| 0.0100 | 100 | 0.0 |
| 0.0075 | 100 | 0.0 |
| 0.00625 | 100 | 0.0 |
| 0.0050 | 98 | 0.0 |
| 0.003125 | 97 | 17.0 |
| 0.00156 | 87 | 48.0 |
| IUC | | 100.0 |
| UUC | 100 | 0.0 |

EXAMPLE 5

Ten turkeys, one day old, were used per group and ten turkeys for the unmedicated controls were employed. Indicated amounts of the drug were mixed with the turkey feed in a mechanical mixer. The turkeys were kept on the test drug feed for four weeks. The records of weight gain, feed consumption and feed efficiency were kept. The results are shown in the following table.

|  | WG (percent) | Feed efficiency |
|---|---|---|
| Percent of active drug in feed: | | |
| 0 | 100 | 1.81 |
| 0.0025 | 133 | 1.62 |
| 0.00312 | 110 | 1.71 |
| 0.005 | 114 | 1.38 |
| 0.00625 | 109 | 1.71 |
| 0.0075 | 103 | 1.74 |
| 0.010 | 103 | 1.51 |
| 0.0125 | 113 | 1.51 |
| 0.015 | 107 | 1.59 |
| 0.020 | 105 | 1.62 |

EXAMPLE 6

Ten turkey poults for each of medicated group, infected unmedicated controls (IUC) and uninfected unmedicated controls (UUC) were employed. Indicated amounts of the drug were mixed with the turkey feed in a mechanical mixer and given simultaneously with the infection 2, 5, 7 and 10 days after infection. The infection consisted in administering orally by pipette 500 embryonated eggs of *Heterakis gallinae* containing *Histomonas meleagridis*. The turkeys were kept on the test drug feed mixture for 21 days and then sacrificed and autopsied and examined for hepatic and cecal lesions. The number of survivors and the intensity of lesions appearing in the liver and ceca of each turkey was observed. The percent mortality was recorded for each group. The relative growth rate of the treated turkeys and uninfected control was determined and is expressed as the weight gain (WG) in percent. 100 percent represents the growth weight of the uninfected unmedicated controls. The results are set forth in the following table.

|  | Treatment days after infection | WG (percent) | Mortality (percent) |
|---|---|---|---|
| UUC | | 100 | 0 |
| IUC | | 59 | 80 |
| Percent of active drug in feed: | | | |
| 0.00625 | 0 | 104 | 0 |
| 0.0125 | 0 | 100 | 0 |
| 0.025 | 0 | 10 | 0 |
| 0.05 | 0 | 110 | 0 |
| 0.00625 | 2 | 97 | 0 |
| 0.0125 | 2 | 101 | 0 |
| 0.025 | 2 | 107 | 0 |
| 0.05 | 2 | 100 | 0 |
| 0.00625 | 5 | 76 | 20 |
| 0.0125 | 5 | 98 | 0 |
| 0.025 | 5 | 109 | 0 |
| 0.05 | 5 | 94 | 0 |
| 0.00625 | 7 | 75 | 50 |
| 0.0125 | 7 | 89 | 0 |
| 0.025 | 7 | 101 | 0 |
| 0.05 | 7 | 88 | 0 |
| 0.00625 | 10 | 57 | 40 |
| 0.0125 | 10 | 73 | 10 |
| 0.025 | 10 | 90 | 0 |
| 0.05 | 10 | 76 | 0 |

EXAMPLE 7

Ten turkey poults for each of medicated groups, infected unmedicated controls (IUC) and uninfected unmedicated controls (UUC) were employed. Indicated amounts of the drug were dissolved in drinking water and given to the birds seven days after infection. The infection was administered the same as in Example 6. The turkeys were kept on the test drug for 14 days and then sacrificed and autopsied and examined as in Example 6. The results are set forth in the following table.

|  | WG (percent) | Mortality (percent) |
|---|---|---|
| IUC | 61 | 75 |
| UUC | 100 | 0 |
| Percent of active drug in water: | | |
| 0.0125 | 101 | 0 |
| 0.0625 | 102 | 0 |
| 0.003125 | 100 | 5 |
| 0.00156 | 77 | 6 |

What is claimed is:
1. A compound selected from the group consisting of 1-methyl-2-isopropyl-5-nitroimidazole and pharmaceutically acceptable water-soluble acid addition salts thereof.

References Cited

UNITED STATES PATENTS

| 2,944,061 | 7/1960 | Jacob et al. | 260—309 |
| 3,037,909 | 6/1962 | Rogers et al. | 260—309 |
| 3,107,201 | 10/1963 | Hoff et al. | 260—309 |

FOREIGN PATENTS

| 1,216,238 | 4/1960 | France | 260—309 |

OTHER REFERENCES

Cosar et al., Arzneimittel-Forschung, vol. 16 (1), pp. 23–9 (1966, January issue), RS1.

NATALIE TROUSOF, Primary Examiner

U.S. Cl. X.R.

99—4; 424—273